(12) United States Patent
Zojer et al.

(10) Patent No.: US 7,257,222 B2
(45) Date of Patent: Aug. 14, 2007

(54) RING VOLTAGE GENERATION CIRCUIT AND METHOD FOR GENERATING A RING VOLTAGE

(75) Inventors: Bernhard Zojer, Villach (AT); Joachim Pichler, Landskron (AT); Maria Giovanna Lagiola, Villach (AT)

(73) Assignee: Infineon Technologies AG, Munich (DE)

( * ) Notice: Subject to any disclaimer, the term of this patent is extended or adjusted under 35 U.S.C. 154(b) by 98 days.

(21) Appl. No.: 10/909,743

(22) Filed: Aug. 2, 2004

(65) Prior Publication Data

US 2005/0254641 A1  Nov. 17, 2005

Related U.S. Application Data

(60) Provisional application No. 60/567,405, filed on Apr. 30, 2004.

(51) Int. Cl.
*H04M 4/00* (2006.01)

(52) U.S. Cl. .................. 379/413.01; 379/418; 379/251; 379/252

(58) Field of Classification Search ................ 379/251, 379/252, 413.01, 418
See application file for complete search history.

(56) References Cited

U.S. PATENT DOCUMENTS 4,431,868 A  2/1984  Bolus et al.

6,026,159 A * 2/2000 Apfel .................... 379/413.01
6,310,954 B1 * 10/2001 Vegter ........................ 379/418

FOREIGN PATENT DOCUMENTS

DE  32 21 693  1/1984

\* cited by examiner

*Primary Examiner*—Jefferey F. Harold
(74) *Attorney, Agent, or Firm*—Maginot, Moore & Beck

(57) ABSTRACT

The present invention relates to a ring voltage generation circuit for generating a ring voltage (VTR) between a TIP lead (9) and a RING lead (10) with minimized power loss for electronic subscriber circuits, comprising:
a) an amplifier circuit (2) which receives an input voltage (VI) for amplifying the input voltage (VI) to provide the ring voltage (VTR);
b) an absolute value generator (3) which receives the input voltage (VI), measures an absolute value (|VI|) of the input voltage (VI) and outputs the measured absolute value (|VI|) of the input voltage (VI);
c) a DC/DC converter (4) which receives the measured absolute value (|VI|) of the input voltage (VI) and converts the measured absolute value (|VI|) of the input voltage (VI) into a supply voltage (VSUPPLY) for the amplifier circuit (2); and
d) a common mode feedback device (5) which receives the supply voltage (VSUPPLY), a TIP potential (VT) of the TIP lead (9) and a RING potential (VR) of the RING lead (10) and which generates thereof a control voltage (VC), whereas the common mode feedback device (5) controls the amplifier circuit (2) by means of the control voltage (VC)

20 Claims, 4 Drawing Sheets

RING VOLTAGE GENERATION CIRCUIT AND METHOD FOR GENERATING A RING VOLTAGE

The present invention relates to a ring voltage generation circuit and method for generating a ring voltage between a TIP lead and a RING lead with minimized power loss for electronic subscriber circuits.

BACKGROUND

Within the technical field of the present invention, a sinusoidal alternating voltage with a frequency between 20 and 50 Hz and with a relatively high amplitude up to 250 V (peak to peak) is used as a ring signal.

Generally, there are two different solutions known in the art to generate such a ring signal. Within the first solution, a central generator is connected with one lead, normally the RING lead, by means of a relay. The other lead, normally the TIP lead, is connected to ground. The electronic subscriber line interface circuit (SLIC) has to be disconnected from the line because of the high voltage of 250 V. This solution is known as unbalanced solution, because only one lead is used.

Within the second solution, it is utilized that the driver circuit of the subscriber line interface circuit has the ability to supply a signal with sufficient amplitude to the TIP and RING lead. In this case, the TIP and RING leads are driven differentially, and balanced respectively. Advantageously, the balanced solution comprises the half voltage swing compared to the unbalanced solution. However, there is also a problem remaining. Due to the high power consumption of the driver circuit, there is a high power loss.

A way to reduce the power loss is described in the patent application EP 0903926 A1. The aim of this patent application is that the power loss of the power amplifier which amplifies a low amplitude ring voltage is reduced in that the operating voltage respectively supply voltage of the power amplifier is not constant, but that it is controlled. This takes place through a switching controller so that in time segments the operating voltage respectively supply voltage is only insignificantly greater than the ring voltage. A disadvantage here is that two different supply voltages are needed for providing an alternating ring signal. Two different supply voltages mean a higher effort in place and a higher complexity in the circuitry. For example, FIG. 1 shows a V-t-diagram illustrating the balanced generation of the ring signal by means of two different supply voltages. The ring signal VTR is defined by the difference between the TIP potential VT and the RING potential VR. FIG. 1 shows that for the generation of the TIP potential VT, a negative supply voltage V− is needed, whereas for the generation of the RING potential VR, the positive supply voltage V+ is needed. The TIP potential VT and the RING potential VR are phase-delayed at 180°.

SUMMARY

Accordingly, it is the object of the present invention to provide the generation of a ring voltage with minimized power loss by means of one single supply voltage.

This object is achieved by means of a ring voltage generation circuit and by means of an associated method according to embodiments of the invention.

Therefore, the invention provides a ring voltage generation circuit for generating a ring voltage between a TIP lead and a RING lead with minimized power loss for electronic subscriber circuits comprising:

a) an amplifier circuit which receives an input voltage for amplifying the input voltage to provide the ring voltage;
b) an absolute value generator which receives the input voltage, measures an absolute value of the input voltage and outputs the measured absolute value of the input voltage;
c) a DC/DC converter which receives the measured absolute value of the input voltage and converts the measured absolute value of the input voltage into a supply voltage for the amplifier circuit; and
d) a common mode feedback device which receives the supply voltage, a TIP potential of the TIP lead and a RING potential of the RING lead and which generates thereof a control voltage, whereas the common mode feedback device controls the amplifier circuit by means of the control voltage.

An advantage of the present invention is that the power loss due to a difference between the supply voltage and ring voltage is minimized, because the supply voltage is generated as an envelope of the ring voltage.

Another advantage of the present invention is that only one single supply voltage is needed, whereas this single supply voltage is derived from the rectified input voltage. This is reached with a simple circuitry by means of the absolute value generator and the DC/DC converter.

Advantages, developments and improvements of the ring voltage generation circuit according to the invention are found in the subclaims.

In accordance with a preferred development, the DC/DC converter generates the supply voltage such that the supply voltage amounts at least to the input voltage multiplied with the gain value of the amplifier circuit. An advantage of this preferred embodiment is that so the supply voltage forms the envelope for the ring voltage and so the difference between the supply voltage and the ring voltage is minimized, whereas the power loss is therefore minimized.

In accordance with a further preferred development, the common mode feedback device controls the control voltage such that it amounts to the half of the supply voltage. An advantage of this preferred development is that so the TIP potential and the RING potential oscillate over a common mode voltage, whereas the common mode voltage is defined by the half of the sum of the RING potential and the TIP potential, with a phase shift of 180° and so the ring voltage is automatically generated such that it is enveloped within the supply voltage.

In accordance with a further preferred development, the amplifier circuit comprises a differential amplifier, whereas the DC/DC converter provides the supply voltage to the differential amplifier.

In accordance with a further preferred development, the ring voltage generation circuit comprises a first input and a second input, whereas the input voltage is applied between the first input and the second input.

In accordance with a further preferred development, the amplifier circuit comprises two first resistors, whereas one first resistor is coupled between the first input and a non-inverting amplifier input of the differential amplifier, and the other first resistor is coupled between the second input and an inverting amplifier input of the differential amplifier.

In accordance with a further preferred development, the amplifier circuit comprises two second resistors, whereas one second resistor is coupled between the non-inverting amplifier input and the first amplifier output, and the other second resistor is coupled between the inverting amplifier input and the second amplifier output.

In accordance with a further preferred development, the first amplifier output is connected to the TIP lead and the second amplifier output is connected to the RING lead. Advantageously, so the ring voltage is applied between the TIP lead and the RING lead.

The invention further provides a method for generating a ring voltage between a TIP lead and a RING lead with minimized power loss for electronic subscriber circuits, comprising the steps of:
a) providing an input voltage for amplifying the input voltage by means of an amplifier circuit to provide the ring voltage;
b) measuring an absolute value of the input voltage;
c) converting the measured absolute value of the input voltage into a supply voltage for supplying the amplifier circuit; and
d) generating a control voltage for controlling the amplifier circuit by means of the supply voltage, a TIP potential of the TIP lead and a RING potential of the RING lead.

BRIEF DESCRIPTION OF THE DRAWINGS

In the following, the preferred embodiment of the ring voltage generation circuit according to the present invention and the method for generating a ring voltage are described with reference to the enclosed figures.

In the figures.

DESCRIPTION

In the figures, identical reference symbols designate identical or functionally identical elements.

Figure 2:
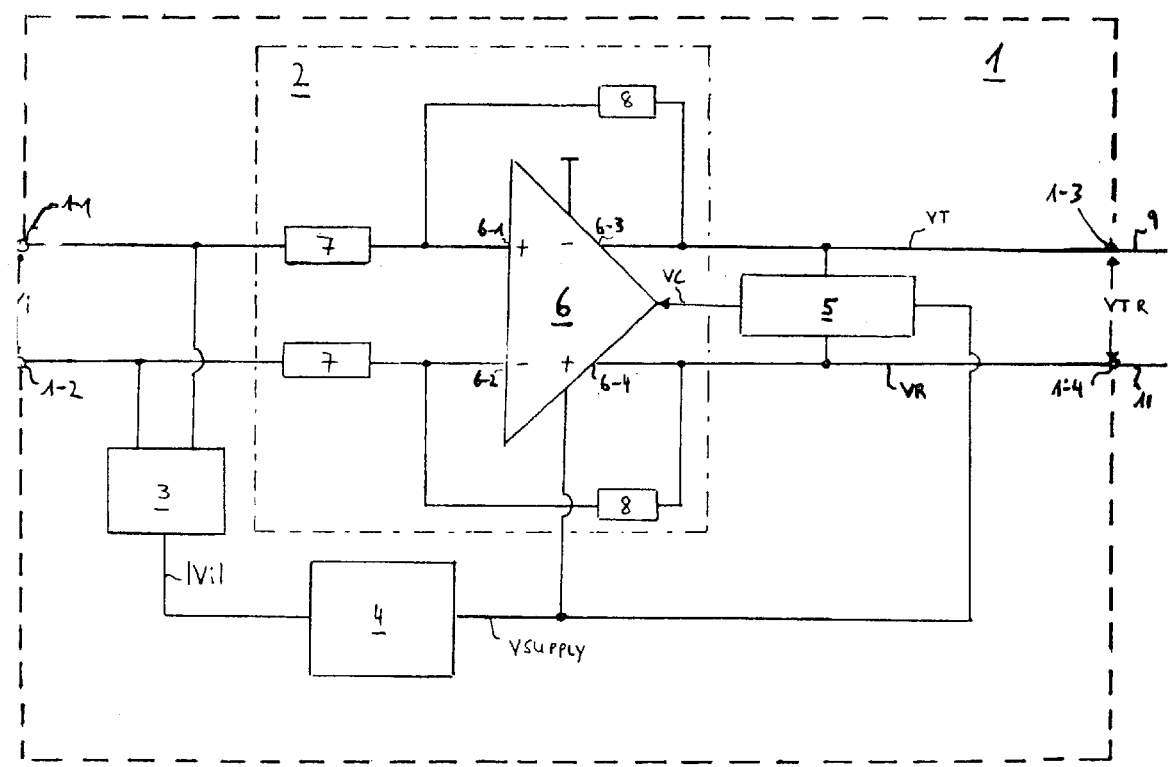
FIG. 2 shows a preferred embodiment of the ring voltage generation circuit according to the present invention.

FIG. 2 shows a preferred embodiment of the ring voltage generation circuit 1 according to the present invention. The ring voltage generation circuit 1 for generating a ring voltage VTR between a TIP lead 9 and a RING lead 10 with minimized power loss for electronic subscriber circuits comprises a first input 1-1, a second input 1-2, a first output 1-3 and a second output 1-4. The input voltage VI is applied between the first input 1-1 and the second input 1-2. The ring voltage VTR is applied between the first output 1-3 and the second output 1-4, whereas the first output 1-3 is connected to the TIP lead 9, and the second output 1-4 is connected to the RING lead 10.

The ring voltage generation circuit 1 comprises an amplifier circuit 2 which receives the input voltage VI for amplifying the input voltage VI to provide the ring voltage VTR. Therefore, the amplifier circuit 2 comprises a differential amplifier 6. The amplifier circuit 2 further comprises two first resistors 7, whereas one first resistor 7 is coupled between the first input 1-1 and the non-inverting amplifier input 6-1 of the differential amplifier 6, and the other first resistor 7 is coupled between the second input 1-2 and an inverting amplifier input 6-2 of the differential amplifier 6. Further, the amplifier circuit 2 comprises two second resistors 8, whereas one second resistor 8 is coupled between the non-inverting amplifier input 6-1 and the first amplifier output 6-3, and the other second resistor 8 is coupled between the inverting amplifier input 6-2 and the second amplifier output 6-4. The resistance value R2 of the second resistor 8 is k times higher than the resistance value R1 of the first resistor 7, whereas k correspond to the gain value of the amplifier circuit 2. The first amplifier output 6-3 is connected to the TIP lead 9, and the second amplifier output 6-4 is connected to the RING lead 10.

The ring voltage generation circuit 1 further comprises an absolute value generator 3, which receives the input voltage VI, measures an absolute value |VI| of the input voltage VI and outputs the measured absolute value |VI| of the input voltage VI.

The ring voltage generation circuit 1 further comprises a DC/DC converter 4 which receives the measured absolute value |VI| of the input voltage VI and converts the measured absolute value |VI| of the input voltage VI into a supply voltage VSUPPLY for the amplifier circuit 2. The DC/DC converter 4 generates the supply voltage VSUPPLY such that the supply voltage VSUPPLY amounts at least to the measured absolute value |VI| of the input voltage VI multiplied with the gain value k of the amplifier circuit 2. The DC/DC converter 4 provides the supply voltage VSUPPLY to the differential amplifier 6. Therefore, the single supply voltage VSUPPLY is derived from the rectified input voltage VI.

The ring voltage generation circuit 1 further comprises a common mode feedback device 5 which receives the supply voltage VSUPPLY, a TIP potential VT of the TIP lead 9 and the RING potential VR of the RING lead 10 and which generates thereof a control voltage VC, whereas the common mode feedback device 5 controls the amplifier circuit 2 by means of the control voltage VC. The common mode feedback device 5 controls a common mode voltage such that it amounts to the half of the supply voltage VSUPPLY. The common mode feedback device 5 the common mode voltage with the half of the supply voltage VSUPPLY and generates thereof the control voltage VC for controlling the differential amplifier 6, whereas the control voltage VC is only one embodiment of on general control signal which could be used. Thus, the power loss of the ring voltage generation circuit 1 is minimized, because the difference between the supply voltage VSUPPLY and the ring voltage VTR is minimized, because the supply voltage VSUPPLY is generated as the envelope of the ring voltage VTR.

Figure 3:
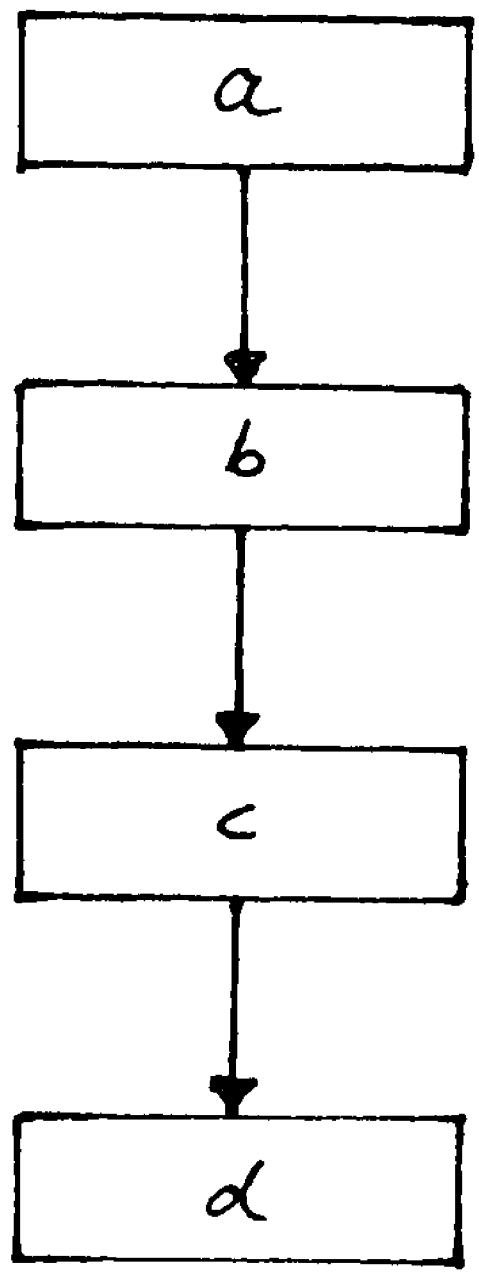
FIG. 3 shows a flowchart for a method for generating a ring voltage according to the present invention.

FIG. 3 shows a flowchart for a method for generating a ring voltage according to the present invention. The method for generating the ring voltage VTR between a TIP lead 9 and a RING lead 10 with minimized power loss for electronic subscriber circuits comprises the steps of:

Method Step a: The input voltage VI is provided to the ring voltage generation circuit 1 for amplifying the input voltage VI by means of an amplifier circuit 2 to provide the ring voltage VTR.

Method Step b: The absolute value |VI| of the input voltage VI is measured.

Method Step c: The measured absolute value |VI| of the input voltage is converted into a supply voltage VSUPPLY for supplying the amplifier circuit 2. The supply voltage VSUPPLY is generated such that it amounts to at least the input voltage VI multiplied with the gain value k of the amplifier circuit 2.

Method Step d: A control voltage VC for controlling the amplifier circuit 2 is generated by means of the supply voltage VSUPPLY, a TIP potential VT of the TIP lead 9 and a RING potential VR of the RING lead 10. The control voltage VC is controlled such that it amounts to half of the supply voltage VSUPPLY.

Figure 1:
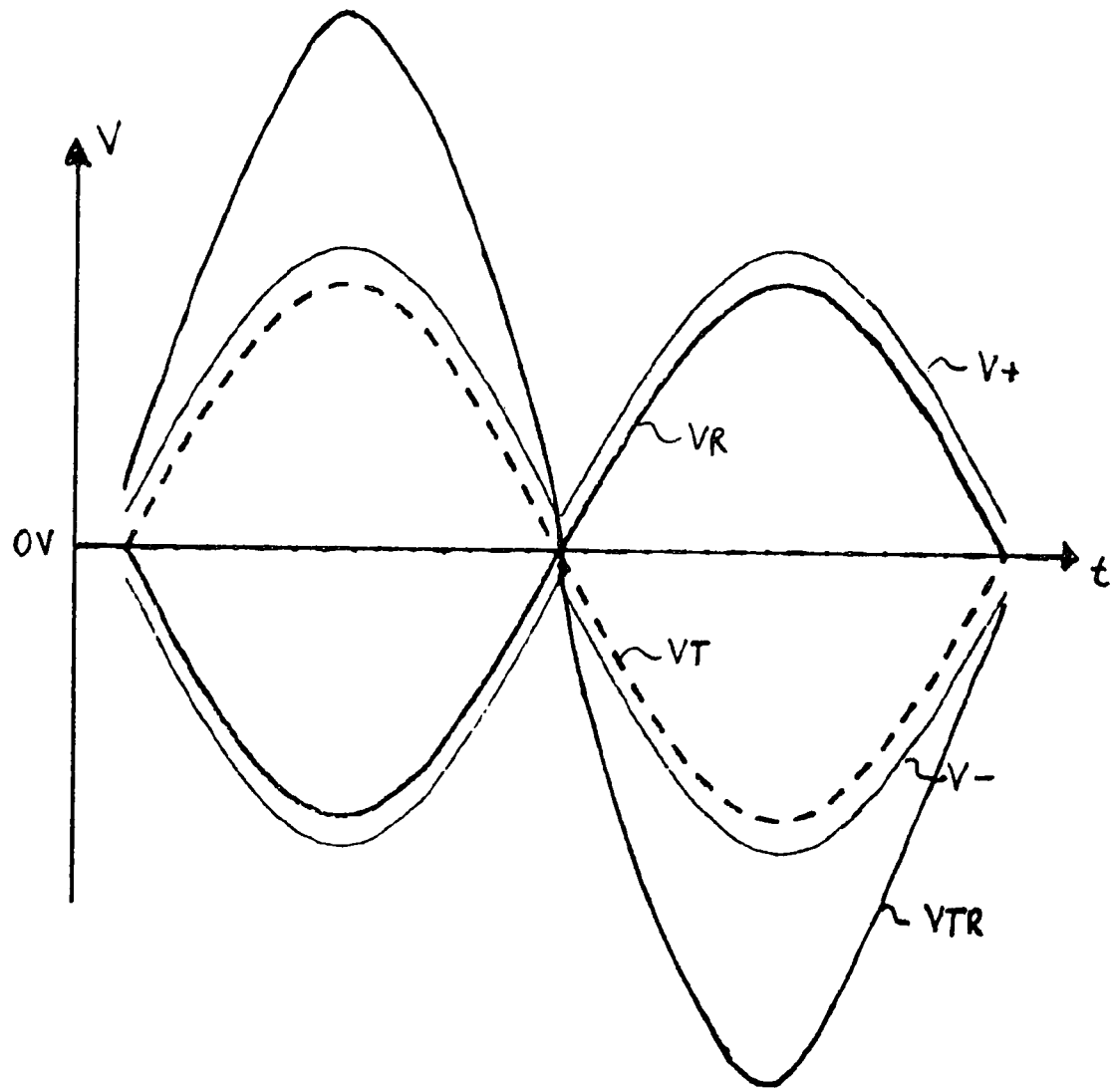
FIG. 1 shows a V-t-diagram illustrating the differential generation of the ring voltage by means of two different supply voltages according to the state of the art.
Figure 4:
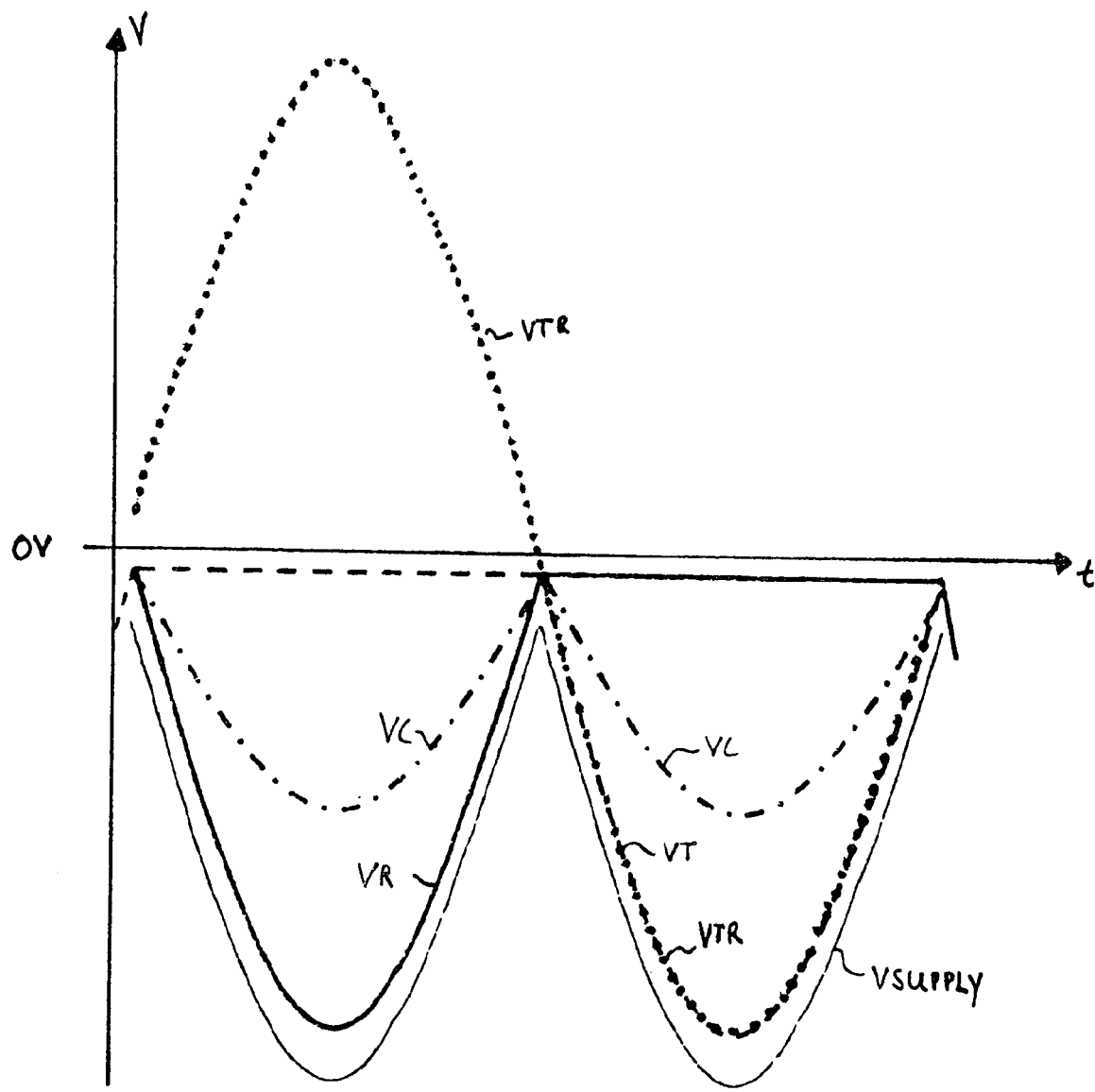
FIG. 4 shows a V-t-diagram illustrating the differential generation of the ring voltage by means of one single supply voltage according to the present invention.

FIG. 4 shows a V-t-diagram illustrating the differential generation of the ring voltage VTR by means of one single supply voltage according to the present invention. The ring voltage VTR according to FIG. 4 is the result of the ring voltage generation circuit 1 according to FIG. 2 respectively the result of the method according to FIG. 3. It is obvious that the ring voltage VTR of FIG. 4 is the same as the ring voltage VTR of FIG. 1. The important difference between FIG. 4 and FIG. 1 is that for the generation of the ring voltage VTR according to FIG. 1, two different supply voltages, namely the positive supply voltage V+ and the negative supply voltage V−, are needed. In contrast to that, according to the present invention (FIG. 2 and FIG. 3) and with reference to FIG. 4, only one single supply voltage VSUPPLY is needed. The control voltage VC is controlled such that it amounts to the half of the supply voltage VSUPPLY. The amplifier 6 is controlled such that the common mode voltage VC equals to the half of the supply voltage VSUPPLY.

Although the present invention has been described above on the basis of the preferred exemplary embodiment, it is not restricted thereto, but rather can be modified in diverse ways. In particular, different amplifier circuits can be used.

The invention claimed is:

1. A ring voltage generation circuit for generating a ring voltage signal between a TIP lead and a RING lead; comprising:
    a) an amplifier circuit configured to receive an input voltage signal and to amplify the input voltage signal in order to generate the ring voltage signal;
    b) an absolute value generator configured to receive the input voltage signal and to generate a measured absolute value of the input voltage signal;
    c) a DC/DC converter configured to receive the measured absolute value of the input voltage signal and to convert the measured absolute value into a supply voltage for the amplifier circuit, the DC/DC converter operably coupled to provide the supply voltage to a supply input of the amplifier circuit; and
    d) a common mode feedback device configured to receive the supply voltage, a TIP potential of the TIP lead and a RING potential of the RING lead, and further configured to generate a control voltage based on the received supply voltage, TIP potential of the TIP lead, and RING potential, wherein the common mode feedback device is operable to control the amplifier circuit using the control voltage.

2. The ring voltage generation circuit according to claim 1, wherein:
    the DC/DC converter is operable to generate the supply voltage such that the supply voltage amounts to at least the measured absolute value of the input voltage multiplied with a gain value (k) of the amplifier circuit.

3. The ring voltage generation circuit according to claim 1, wherein:
    the common mode feedback device is operable to control the control voltage such that the control voltage amounts to substantially half of the supply voltage.

4. The ring voltage generation circuit according to claim 1, wherein:
    the ring voltage generation circuit comprises a first input and a second input, and wherein the input voltage signal is applied between the first input and the second input.

5. The ring voltage generation circuit according to claim 4, wherein:
    the amplifier circuit includes a differential amplifier, and further comprises a first input resistor coupled between the first input and a non-inverting amplifier input of the differential amplifier, and a second input resistor coupled between the second input and an inverting amplifier input of the differential amplifier.

6. The ring voltage generation circuit according to claim 5, wherein:
    the amplifier circuit further comprises a first feedback resistor coupled between the non-inverting amplifier input and a first amplifier output, and a second feedback resistor coupled between the inverting amplifier input and a second amplifier output.

7. The ring voltage generation circuit according to claim 6, wherein:
    the first amplifier output is connected to the TIP lead and the second amplifier output is connected to the RING lead.

8. The ring voltage generation circuit according to claim 1, wherein:
    the ring voltage signal is defined by a TIP-RING voltage between the TIP lead and the RING lead.

9. A method for generating a ring voltage signal between a TIP lead and a RING lead for electronic subscriber circuits, comprising the steps of:
    a) amplifying an input voltage signal using an amplifier circuit to provide the ring voltage;
    b) measuring an absolute value of the input voltage signal;
    c) converting the measured absolute value of the input voltage into a supply voltage for the amplifier circuit; and
    d) generating a control voltage for controlling the amplifier circuit using the supply voltage, a TIP potential of the TIP lead and a RING potential of the RING lead.

10. The method according to claim 9, wherein:
    step c) further comprises converting the measured absolute value to the supply voltage such that the supply voltage amounts at least to the measured absolute value of the input voltage multiplied with a gain value of the amplifier circuit.

11. The method according to claim 9, wherein:
    step d) further comprises generating the control voltage such that the control voltage amounts to substantially half of the supply voltage.

12. A ring voltage generation circuit for generating a ring voltage signal between a TIP lead and a RING lead; comprising:
    a) an amplifier circuit configured to receive an input voltage signal and to amplify the input voltage signal in order to generate the ring voltage signal;
    b) an absolute value generator configured to receive the input voltage signal and to generate a measured absolute value of the input voltage signal;
    c) a DC/DC converter configured to receive the measured absolute value of the input voltage signal and to convert the measured absolute value into a supply voltage for the amplifier circuit, the DC/DC converter operably coupled to provide the supply voltage to a supply input of the amplifier circuit;
    d) a common mode feedback device configured to receive the supply voltage, a TIP potential of the TIP lead and a RING potential of the RING lead, and further configured to generate a control voltage based on the received supply voltage, TIP potential of the TIP lead, and RING potential, wherein the common mode feedback device is operable to control the amplifier circuit using the control voltage; and wherein the amplifier circuit comprises a differential amplifier, and wherein the DC/DC converter is configured to provide the supply voltage to the differential amplifier.

13. The ring voltage generation circuit according to claim 12, wherein:

the DC/DC converter is operable to generate the supply voltage such that the supply voltage amounts to at least the measured absolute value of the input voltage multiplied with a gain value (k) of the amplifier circuit.

14. The ring voltage generation circuit according to claim 12, wherein:

the common mode feedback device is operable to control the control voltage such that the control voltage amounts to substantially half of the supply voltage.

15. The ring voltage generation circuit according to claim 12, wherein:

the ring voltage generation circuit comprises a first input and a second input, and wherein the input voltage signal is applied between the first input and the second input.

16. The ring voltage generation circuit according to claim 15, wherein:

the amplifier circuit comprises a first input resistor coupled between the first input and a non-inverting amplifier input of the differential amplifier, and a second input resistor coupled between the second input and an inverting amplifier input of the differential amplifier.

17. The ring voltage generation circuit according to claim 16, wherein:

the amplifier circuit further comprises a first feedback resistor coupled between the non-inverting amplifier input and a first amplifier output, and a second feedback resistor coupled between the inverting amplifier input and a second amplifier output.

18. The ring voltage generation circuit according to claim 17, wherein:

the first amplifier output is connected to the TIP lead and the second amplifier output is connected to the RING lead.

19. The ring voltage generation circuit according to claim 12, wherein:

the ring voltage signal is defined by a TIP-RING voltage between the TIP lead and the RING lead.

20. A method for generating a ring voltage signal between a TIP lead and a RING lead for electronic subscriber circuits, comprising the steps of:

a) amplifying an input voltage signal using a differential amplifier circuit to provide the ring voltage;

b) measuring an absolute value of the input voltage signal;

c) using a DC/DC converter to convert the measured absolute value of the input voltage into a supply voltage for the differential amplifier circuit; and d) generating a control voltage for controlling the amplifier circuit using the supply voltage, a TIP potential of the TIP lead and a RING potential of the RING lead; and e) providing the supply voltage to the differential amplifier using the DC/DC converter.

* * * * *

UNITED STATES PATENT AND TRADEMARK OFFICE
CERTIFICATE OF CORRECTION

PATENT NO. : 7,257,222 B2 Page 1 of 1
APPLICATION NO. : 10/909743
DATED : August 14, 2007
INVENTOR(S) : Zojer et al.

It is certified that error appears in the above-identified patent and that said Letters Patent is hereby corrected as shown below:

Title Page item 75
Please change "Maria Giovanna Lagiola" to --Maria Giovanna Lagioia--

Signed and Sealed this

Twenty-seventh Day of May, 2008

JON W. DUDAS
*Director of the United States Patent and Trademark Office*